(12) United States Patent
Hendrich et al.

(10) Patent No.: US 7,213,688 B2
(45) Date of Patent: May 8, 2007

(54) DISC BRAKE HAVING AT LEAST TWO FRICTION RINGS

(75) Inventors: Uwe Hendrich, Steinbach (DE); Rolf Weiler, Eppstein (DE); Jürgen Bauer, Wiesbaden (DE); Stefan Heinz, Eppstein (DE); Nándor Csöri, Hajdúnánás (HU)

(73) Assignee: Continental Teves AG & Co. oHG, Frankfurt (DE)

( * ) Notice: Subject to any disclaimer, the term of this patent is extended or adjusted under 35 U.S.C. 154(b) by 27 days.

(21) Appl. No.: 10/522,964

(22) PCT Filed: Jul. 28, 2003

(86) PCT No.: PCT/EP03/08304

§ 371 (c)(1),
(2), (4) Date: Jan. 31, 2005

(87) PCT Pub. No.: WO2004/022996

PCT Pub. Date: Mar. 18, 2004

(65) Prior Publication Data

US 2006/0049005 A1      Mar. 9, 2006

(30) Foreign Application Priority Data

Aug. 16, 2002 (DE) ............................. 102 38 426
Sep. 6, 2002 (DE) ............................. 102 41 416
Jun. 26, 2003 (DE) ............................. 103 29 197

(51) Int. Cl.
*F16D 55/36* (2006.01)

(52) U.S. Cl. ............................ 188/71.5; 188/72.4

(58) Field of Classification Search .............. 188/71.1, 188/71.5, 724
See application file for complete search history.

(56) References Cited

U.S. PATENT DOCUMENTS

| | | | | |
|---|---|---|---|---|
| 3,448,831 A | * | 6/1969 | Newstead | 188/71.3 |
| 4,064,974 A | * | 12/1977 | Filderman | 188/71.3 |
| 4,234,061 A | * | 11/1980 | Margetts et al. | 188/71.3 |
| 6,044,935 A | * | 4/2000 | Mery et al. | 188/71.5 |

FOREIGN PATENT DOCUMENTS

| | | |
|---|---|---|
| DE | 1 872 954 | 5/1963 |
| DE | 1 800 549 | 5/1970 |
| DE | 26 26 567 | 1/1977 |
| DE | 3605788 | * 8/1987 |
| FR | 2 505 280 | 11/1982 |
| GB | 2 074 265 A | 10/1981 |
| WO | WO 98/25804 | 6/1998 |
| WO | WO 98/41778 | 9/1998 |

* cited by examiner

*Primary Examiner*—Devon Kramer
(74) *Attorney, Agent, or Firm*—RatnerPrestia

(57) ABSTRACT

A disc brake for a motor vehicle having at least two axially stationary friction rings being connected to a rotatable hub. The disc brake comprises several brake pads cooperating with the associated friction rings during a braking operation. A favorable structural overall design of the disc brake is achieved by a brake caliper straddling all friction rings and the associated brake pads and including a first actuating device in a brake caliper portion that extends axially beside the friction rings, and a second actuating device that is arranged between two friction rings and acting axially on both sides. Said actuating device acts on the brake pads arranged between two friction rings and is arranged so as to be displaceable relative to the brake caliper.

17 Claims, 7 Drawing Sheets

DISC BRAKE HAVING AT LEAST TWO FRICTION RINGS

TECHNICAL FIELD

The present invention relates to a disc brake having at least two friction rings connected to a rotatable hub. In this arrangement, the disc brake comprises a plurality of brake pads interacting with the associated friction rings during a braking operation.

BACKGROUND OF THE INVENTION

Thus, WO 98/25804 A1 discloses a design of a disc brake with two brake discs for a motor vehicle being integrated into a wheel suspension. In this arrangement, especially an actuating device of the disc brake is arranged in a steering knuckle pertaining to the wheel suspension. The two brake discs are connected to a rotatable wheel hub in an anti-torsion and axially displaceable manner. Brake pads cooperating with the brake discs are displaceably guided on a brake housing, with said brake housing being mounted on the vehicle. For applying a disc brake of this type, the actuating device is used to apply the brake discs and the brake pads against each other by way of axial displacement. As this occurs, corrosion impairs the ease of displacement of both the brake discs and the brake pads that is important for the braking function.

Further, international patent application WO 98/41778 A1 describes a motor vehicle disc brake with two brake discs, which, at an axial distance, are stationarily arranged on a wheel hub. Associated brake pads are displaceably arranged within a combined disc brake device. During a braking operation, the brake pads can hence be urged by way of axial displacement against the respectively associated brake disc. To this end, the disc brake device comprises a first fixed-caliper-type component, which is mounted on the vehicle and interacts with a first brake disc by way of brake pads. In order to urge the brake pads against the associated first brake disc during braking operation, the fixed-caliper-type component has a hydraulic actuating device on both sides of the first brake disc. The fixed-caliper-type component is additionally used as a brake holder for a second floating-caliper-type component of the disc brake device. In this arrangement, the floating-caliper-type component straddles the second brake disc and brake pads being arranged on either side of this brake disc and is displaceably mounted on the first fixed-caliper-type component. The floating-caliper-type component comprises another hydraulic actuating device in order to move the corresponding brake pads into abutment on the second brake disc when the brake is applied. The disc brake device consequently has a fixed-caliper and a floating-caliper component emboxed in each other. This type of construction is unnecessarily complicated and, what is more, requires three actuating devices in order to press the individual brake pads accordingly against the associated brake discs.

BRIEF SUMMARY OF THE INVENTION

In view of the above, the invention is based on a disc brake having at least two friction rings which, at an axial distance from each other, are stationarily arranged on a rotatable hub, having brake pads associated with each friction ring and being displaceably arranged in each case on both sides of the friction ring. Based on these conditions, an object of the invention is to disclose a disc brake with at least two friction rings which, compared to prior art types of construction, exhibits a simple overall construction that can be realized at low costs. The axially stationary friction rings allow economizing a sophisticated axial guiding of the friction rings, as it has been frequently customary in previous types of construction. Further, the employment of one single brake caliper with a displaceable second actuating device reduces the effort in construction for the disc brake. The actuating devices, i.e. the first and/or the second actuating device, can principally generate the brake application force within the disc brake, for example, hydraulically, electrically, electromagnetically, electromotively, or in any other suitable fashion.

This object is achieved for the generic disc brake mentioned hereinabove by a brake caliper straddling all friction rings and the associated brake pads and including a first actuating device in at least one brake caliper portion that extends axially beside the friction rings and a second actuating device that is arranged between two friction rings, is active axially at least on one side and acts on at least one brake pad arranged between two friction rings.

The use of two or more friction rings with associated brake pads principally allows realizing very high rates of braking power. Thus, the brake caliper includes a first actuating device in a brake caliper portion that extends axially beside the friction rings in order to displace at least one brake pad directly against the associated friction ring in a braking operation. When the second actuating device operates only on one side, this actuating device is still able to expediently operate both with a fixed-type caliper and a floating caliper, provided it is floatingly mounted. When it is stationarily arranged on the caliper of a fixed-caliper brake, for example, two serially arranged, one-sidedly operating actuating devices are required which operate in parallel and press the corresponding brake pads against the friction rings.

A significantly simpler design is achieved for the disc brake of the invention when the second actuating device is acting on both sides and acts on two brake pads arranged between two friction rings. Although the type of driving the actuating device is not important for the invention at topic, especially a hydraulic drive is very well suited as a driving mechanism because it is herein safeguarded that the same amount of pressure is applied to the two brake pads.

The invention is well applicable to a fixed-caliper brake wherein the friction rings do not change their position in relation to the caliper. The actuating device can then act in a two-sided manner because two serially disposed pistons are provided e.g. in a cylinder and are actuated by the same pressure source. It is not necessary in this case to arrange the actuating device so as to be floating in an axial direction, whereby a simpler design for the brake is achieved. When the actuating device is floatingly arranged, it is also possible for it to act in only one direction, because in this case e.g. the housing of the device can press against the one brake pad, while the piston can press against the other brake pad.

In improving the invention, its employment in a floating-caliper brake is especially advisable, wherein the second actuating device can be fixed or displaceably arranged at the caliper or a brake holder of the floating caliper that is fixed in relation to the vehicle, or at any other component that is fixed in relation to the vehicle, respectively. Only one single first actuating device in the floating caliper is necessary in such a case. The use of a brake holder, with a corresponding design, provides the additional advantage of guiding the brake pads on the brake holder in an axially displaceable fashion and of supporting them in a circumferential direction.

A favorable first embodiment of the second actuating device between two friction rings is achieved in that the second actuating device is guided so as to be displaceable directly on the brake caliper. The brake caliper can then be configured as a floating caliper and as a fixed caliper. The second actuating device is preferably acting on both sides and, thus, additionally allows pressing the brake pads interposed between two friction rings against the associated friction rings.

In an alternative variant of the disc brake, the second actuating device is displaceably mounted on a component fixed to the vehicle, in particular on a brake holder fixed to the vehicle. In this arrangement, the brake caliper is designed as a floating caliper being displaceably mounted in relation to a component fixed to the vehicle, above all to the brake holder fixed to the vehicle. This type of construction is additionally improved by means of a brake holder fixed to the vehicle, a portion of which projects axially over at least one friction ring, wherein at least one brake pad and the second actuating device are displaceably guided on this brake holder portion. It is then possible to displaceably mount both the brake pads and the second actuating device on the same guiding portion of the brake holder. This reduces the machining effort for the brake holder.

Because the initial position of the floating caliper relative to the brake holder will change in the course of time due to the wear of the (outboard) friction lining, it is favorable to fix the second actuating device at the caliper. This condition will additionally facilitate the supply of hydraulic pressure when a hydraulic drive is used. However, the actuating device can also be mounted on the brake holder, thereby enabling it to automatically follow the change in position of the caliper in relation to the brake holder.

Figure 1:
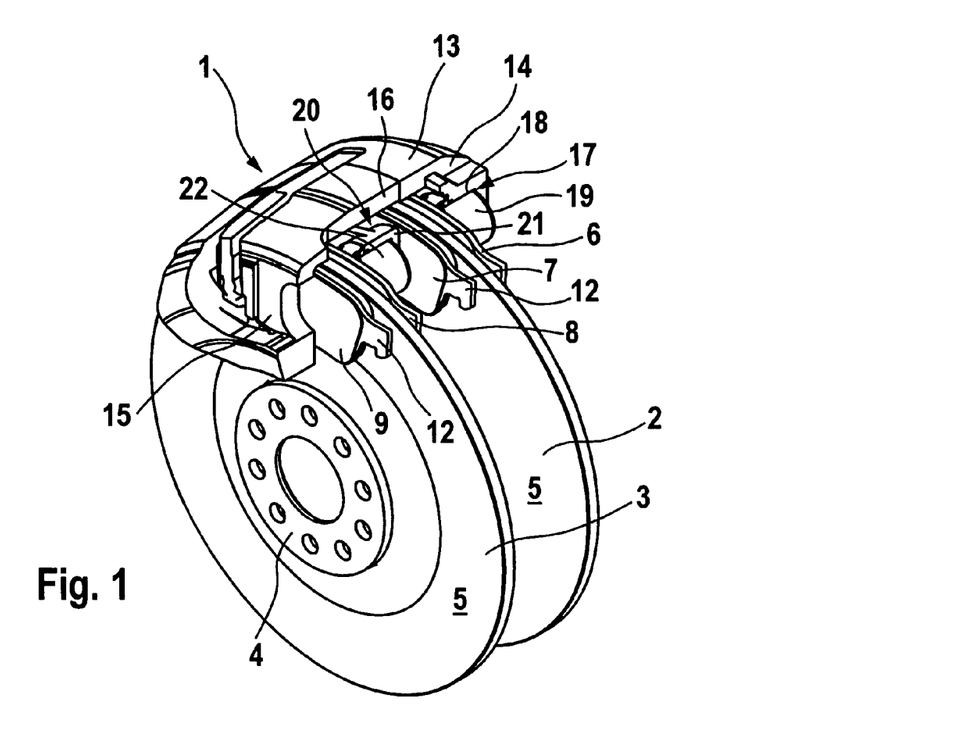
FIG. 1 shows a partial cross-sectional spatial view of a first embodiment of a disc brake having two stationary friction rings, with associated brake pads and a floating caliper.
Figure 2:
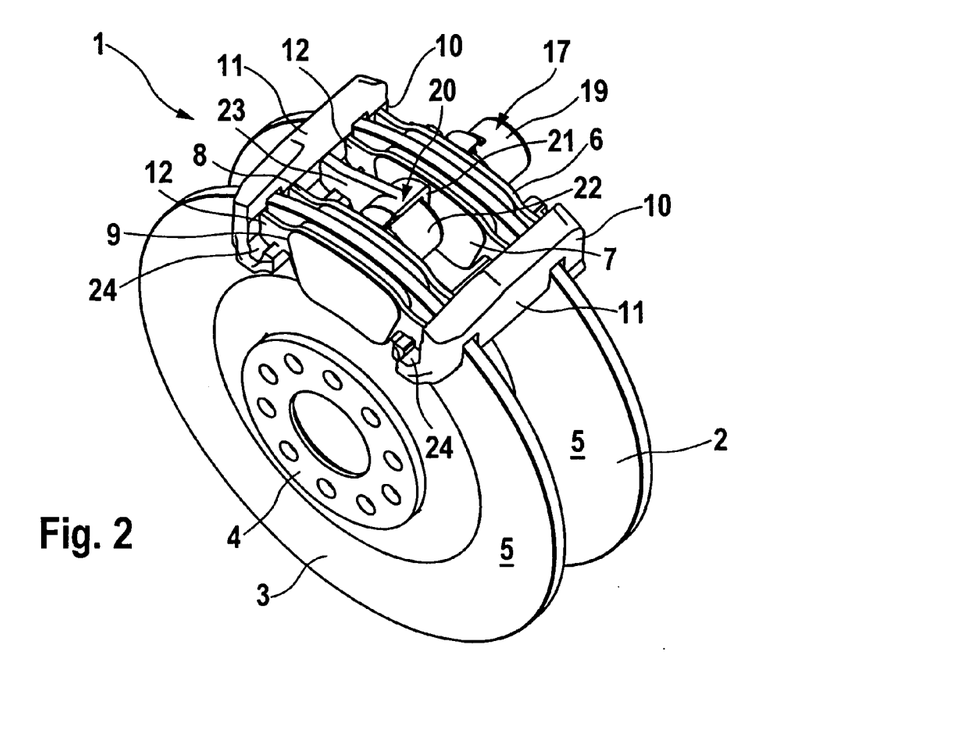
FIG. 2 shows a partial cross-sectional spatial view of an associated brake holder having brake pads for a floating-caliper disc brake according to FIG. 1.
Figure 3:
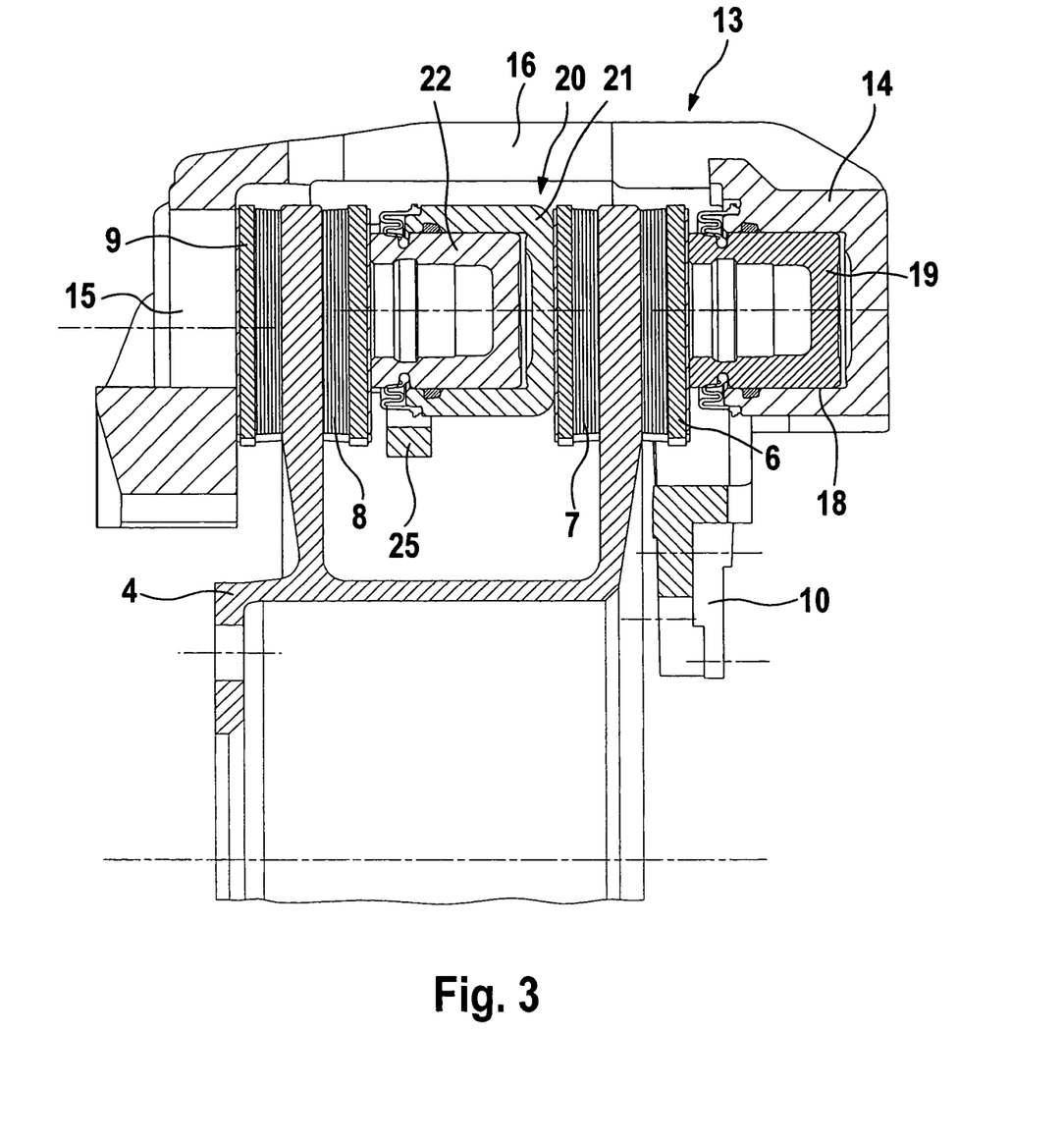
FIG. 3 shows a cross-sectional view of a disc brake according to FIGS. 1 to 2.
Figure 4:
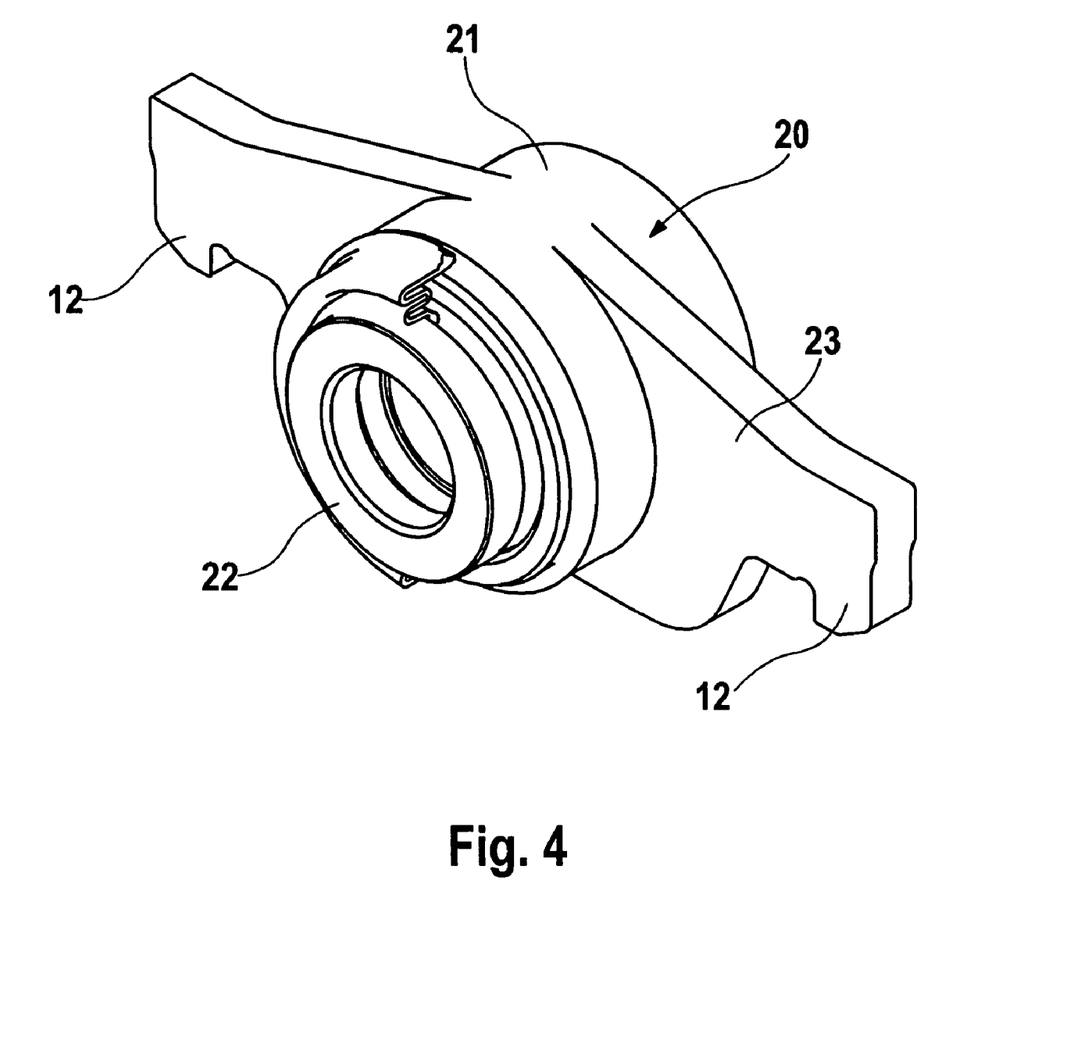
FIG. 4 shows an enlarged spatial view of a second actuating device of FIGS. 1 to 3.

A particularly simple structure for a two-sidedly acting second actuating device is obtained because the actuating device includes two pistons that limit a working chamber hydraulically, and because the working chamber is connected to the hydraulic circuit feeding the first actuating device. It is hereby ensured in a simple fashion that in each case the brake pads can be applied with equal pressure to either side of the two friction rings. In this arrangement, the pistons can be guided in a cylinder lying axially behind one another (FIG. 5) or also being displaceably nested, with the outside piston being displaceably guided in a housing (FIG. 3).

When the two pistons are arranged one behind the other in a cylinder (FIG. 5) and the cylinder is rigidly connected to the caliper of a floating-caliper brake, attention must be paid to the fact that the position of the cylinder changes with the position of the caliper as the outside brake pad wears off. Therefore, the second piston pointing to the outside friction ring shall be longer than the opposite first piston according to the invention because the cylinder along with the caliper moves inwards, while simultaneously the back plate of the brake pad acted upon by the second piston moves (relatively) outwards. When these rules are observed, it is possible to keep the overall length of the second actuating device very short.

When it is desired to arrange the actuating device so as to be displaceable on the holder arms of the brake holder, it is advisable according to an improvement of the invention to connect the second actuating device to one of the two brake pads being arranged between the two friction rings. This way a unit can be achieved which is composed of a brake pad and the second actuating device, what will reduce the number of the necessary individual components and the weight of the disc brake.

DETAILED DESCRIPTION OF THE PREFERRED EMBODIMENTS

The disc brake 1 for a motor vehicle of the invention as shown in FIGS. 1 to 4 comprises two friction rings 2, 3 that are fixed to a rotatable wheel hub 4. In this arrangement, the friction rings 2, 3, at an invariable axial distance, are unrotatably secured to the wheel hub 4 or integrally shaped thereat. In particular, the friction rings 2, 3 can be detachably fastened to the wheel hub 4. The friction rings 2, 3 cooperate with associated bake pads 6 to 9 of the disc brake 1 by way of corresponding friction surfaces 5 being respectively provided on both sides in order to thereby achieve braking power in the case of a braking operation. Further, the disc brake 1 comprises a brake holder 10 fixed to the vehicle and projecting with two holder arms 11 over the two friction rings 2, 3 in an axial direction. Herein the brake holder 10 is either fixed to the vehicle or integrated into a component fixed to the vehicle, e.g. a steering knuckle. The brake pads 6 to 9 are axially displaceably guided and tangentially supported on the holder arms 11. The indications of direction refer to the axis of rotation of the friction rings in this context. In detail, the brake pads 6 to 9 each include tangentially lateral guiding extensions 12 being received in correspondingly shaped guiding recesses 24 of the holder arms 11 in a substantially form-locking fashion. Thus, peripheral brake forces at the brake pads 6 to 9 that develop during operation of the disc brake 1 can be discharged to the holder arms 11 or the brake holder fixed to the vehicle, respectively. To additionally reinforce the holder arms 11, it is favorable to interconnect said arms by a web 25 (see FIG. 3) that extends in a substantially tangential direction. This arrangement reduces the degree of the elastic deformation of the holder arms 11 on account of peripheral brake forces.

Besides, a floating caliper 13 is displaceably mounted on the brake holder 10 and straddles the friction rings 2, 3 and the brake pads 6 to 9 arranged in each case on both sides of the friction rings 2, 3. For the displaceable arrangement of the floating caliper 13, guiding devices (not shown), e.g. pin guides, are provided that act in particular between the brake holder 10 and the floating caliper 13. The floating caliper 13 principally comprises two caliper legs 14, 15 that extend laterally beside the friction rings 2, 3 and extend generally in parallel to the friction rings 2, 3. The two caliper legs 14, 15 are interconnected by a bridge portion 16 that projects axially over the fiction rings 2, 3. The floating caliper 13 has preferably an integral design. It is however principally possible for it to consist of several members that have to be interconnected.

The floating caliper 13 has an integral and frame-type design in the embodiments according to FIGS. 1 to 4. However, other types of construction of a brake caliper are also feasible for a disc brake 1 of the invention.

To apply the disc brake 1 during a braking operation, the floating caliper 13 includes a first actuating device 17 in the caliper leg that is axially inwards with respect to the vehicle, said actuating device acting on at least one brake lining 6 to 9. The first actuating device 17 is designed as a hydraulic actuating device 17 in the present embodiment, including a cylinder 18 integrated in the caliper leg 14 and a piston 19 displaceably arranged therein. Piston 19 enables the first actuating device 17 to apply the axially inward brake pad 6 directly against the associated friction ring 2 during a braking operation, while the axially outward brake pad 9 is pressed indirectly against the outward friction ring 3 due to an axial displacement of the floating caliper 13.

In addition, a second actuating device 20 is arranged between the friction rings 2, 3 and acts on the brake pads 7, 8 disposed between the friction rings 2, 3. Likewise the second actuating device 20 is hydraulically operable and comprises a cylinder 21 and a piston 22 displaceably mounted therein. Principally, the two actuating devices 17, 20 need not be supplied hydraulically with a brake-applying force. Similarly, other actuation devices 17, 20 may also be used, which are fed with actuating energy or brake-applying force in an electrical, electromotive, electromagnetical, piezoelectrical, or any other comparable manner. The second actuating device 20 is then acting axially on both sides so that during braking operation both brake pads 7, 8 arranged between the friction rings 2, 3 can be pressed almost simultaneously against the associated friction surface 5. In the second actuating device 20 according to FIGS. 1 to 4, a braking operation causes the piston 22 to be urged against a brake pad 8, while the cylinder 21 is urged against the other brake pad 7 due to a reaction force. Alternatively, a second actuating device 20 with a cylinder 21 open on either side can be used, and two pistons 22 associated with the brake pads 7, 8 are displaceably received in cylinder 21.

The second actuating device 20 is guided in an axially displaceable manner within the disc brake 1 due to the axially stationary arrangement of the friction rings 2, 3. In particular, the second actuating device 20 is connected to a carrier 23 which in turn is displaceably guided on the brake holder 10. In principle, the second actuating device 20 can also be guided displaceably on any other component fixed to the vehicle. The carrier 23 is displaceably guided on the brake holder 10 in the embodiment of the disc brake 1 shown in FIGS. 1 to 4. To this end, the carrier 23 and the brake pads 6 to 9 include lateral guiding extensions 12 which in turn are received in a substantially form-locking manner in the guiding recesses 24 of the holder arms 11. Thus, the guiding recesses 24 in the holder arms 11 can be used for the displaceable guiding of both the brake pads 6 to 9 and the second actuating device 20. This simplifies the manufacture of the brake holder 10 in total. The configuration of especially the second actuating device 20 according to the invention will thus allow uniformly pressing all brake pads 6 to 9 against the respective friction surfaces 5 of the friction rings 2, 3. A brake caliper that is possibly configured in one part can be used in this case.

The design variant shown in the Figures can be simplified in that the second actuating device 20 is directly coupled to one of the brake pads 7, 8 arranged between the friction rings 2, 3. The second actuating device 20 along with the respective brake pad 7, 8 is displaced axially in the holder arms 11. To this end, the second actuating device 20 is connected to the respective brake pad 7, 8 preferably by way of the cylinder 21.

The solution according to the invention is of course not limited to the embodiment shown in the Figures. It is principally also possible to apply a disc brake design according to the invention in arrangements with more than two friction rings positioned in an axially stationary manner.

Further, it is possible to arrange the second actuating device 20 in a displaceable manner on the floating caliper 1. A construction of this type is advisable in the absence of a brake holder 10 with holder arms 11 straddling the friction rings 2, 3.

In addition, the second actuating device can be arranged in an axially stationary fashion on a component fixed to the vehicle, in particular on the brake holder, according to an alternative not shown. To this end it is necessary to configure the stationary second actuating device 20 so as to be acting axially on both sides. This necessitates the provision of actuating elements on both axial sides of the second actuating device 20, said actuating elements being each displaceably mounted in the second actuating device 20 and acting on one of the brake pads 7, 8.

Eventually, it is also feasible to configure the brake caliper of a disc brake of the invention as a fixed caliper mounted on the vehicle. In this arrangement, the second actuating device 20 acting on both sides between two axially stationary friction rings 2, 3 would have to be axially displaceably guided either on a component fixed to the vehicle, e.g. a brake holder, or directly on the fixed caliper. Alternatively, the second actuating device 20 acting on both sides can be arranged in an axially stationary fashion on a component fixed to the vehicle. Compared to designs having a floating caliper, however, two first actuating devices 17 are required when a fixed caliper is used in order to be able to apply a brake-applying force to the axially outward/inward brake pads 6, 9.

The second embodiment of a disc brake of the invention is illustrated in FIGS. 5 to 8. Herein the friction rings 2, 3 are either shaped integrally at the hub or detachably secured thereat. Associated with the friction rings 2, 3 are brake pads 6, 7, 8, 9, which, for achieving braking power during a braking operation, cooperate tribologically with the friction rings. The disc brake further comprises a floating caliper 1 straddling the friction rings 2, 3 and the associated brake pads 6, 7, 8, 9 (see FIG. 5).

The floating caliper 13 of the disc brake shown comprises a first actuating device 17 arranged in a caliper leg in order to be able during braking operation to urge an axially inward brake pad 6 directly and an axially outward brake pad 9 indirectly due to caliper displacement against the associated friction ring 2, 3.

Figure 5:
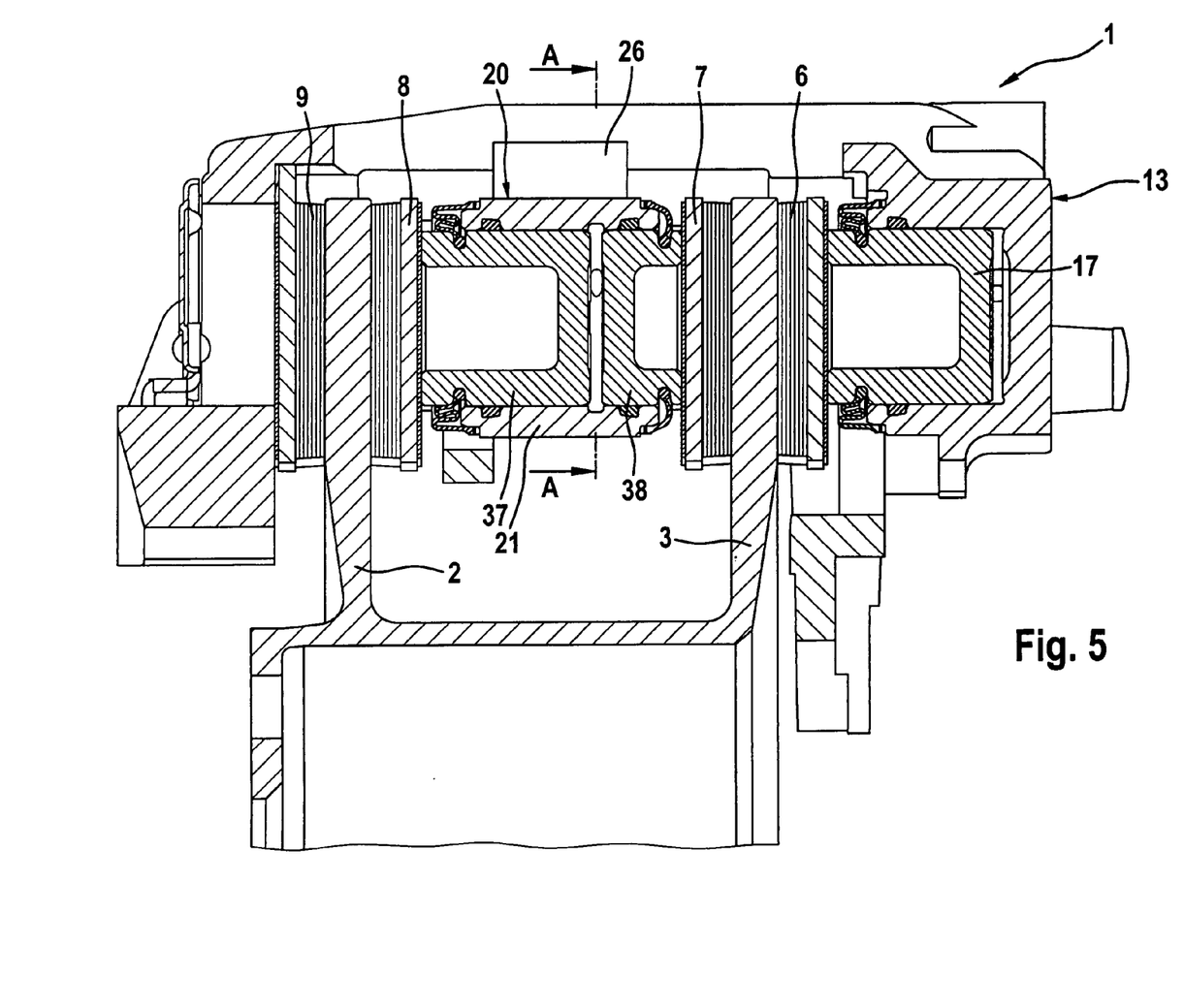
FIG. 5 shows a view of a cross-section taken through a disc brake of the invention as a second embodiment in a first variant.
Figure 6:
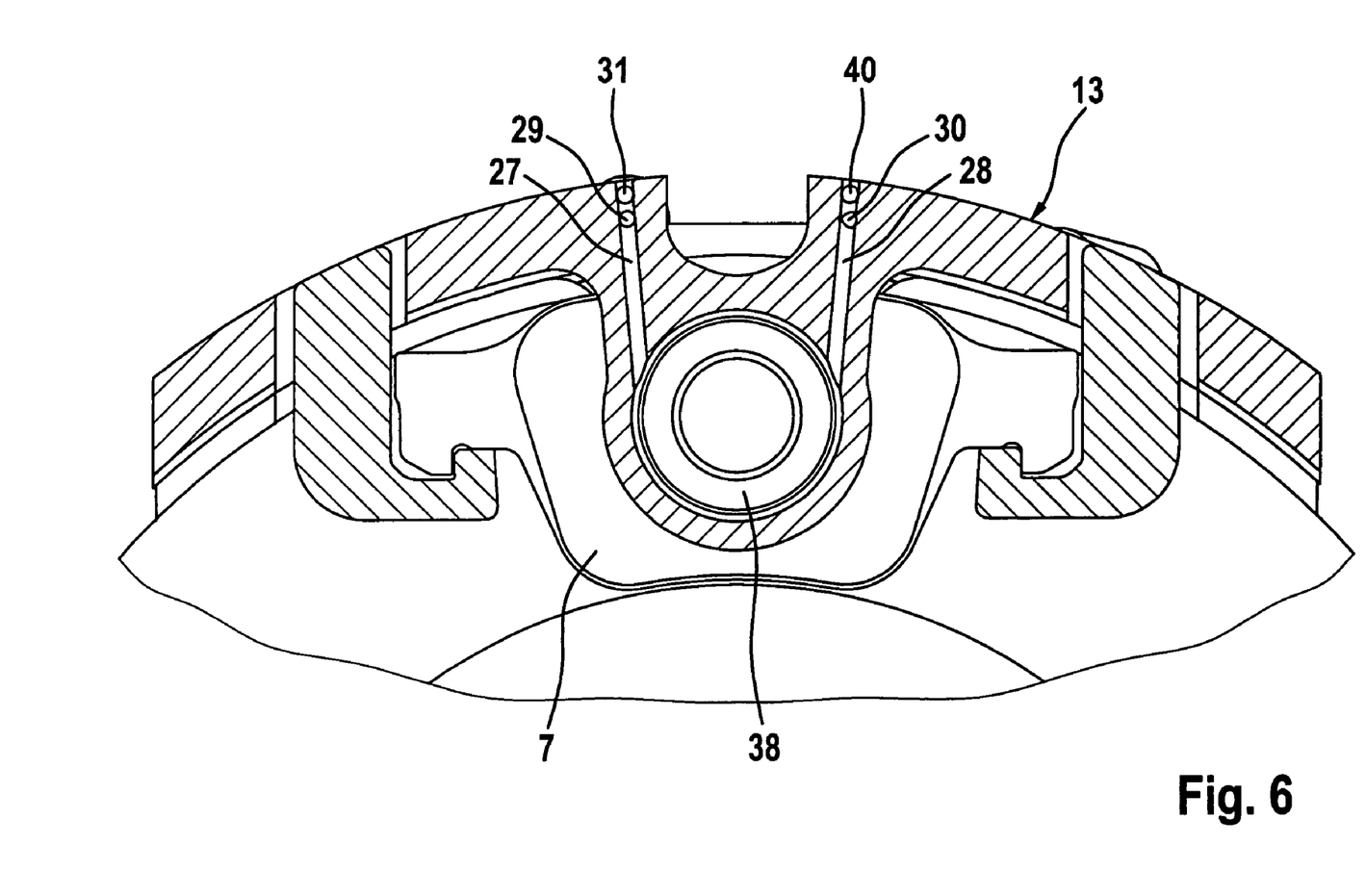
FIG. 6 shows a view of a cross-section taken along line A—A of the disc brake of FIG. 5.

Disposed between the axially immovable friction rings 2, 3 is another second actuating device 20 that is active on both sides and, thus, when activated in the case of a braking operation presses the brake pads 7, 9 arranged between the friction rings 2, 3 against the associated friction rings. As this occurs, the second actuating device 20 is rigidly connected to the floating caliper 1 with the result of achieving a structural unit (see FIG. 8). The two actuating devices can be fed with actuating energy or force e.g. hydraulically, electrically, electromechanically, electromagnetically, electromotively, piezoelectrically, or in any other appropriate fashion. The rigid connection 26 between the floating caliper 1 and the second actuating device 20 will thus enable an uncomplicated energy supply of the second actuating device 20 by suitably configuring the supply lines, above all within the floating caliper 1. In the variants in FIGS. 5 to 8 the two actuating devices are designed hydraulically, in each case with a cylinder and a piston displaceably mounted therein. The second actuating device 20 has two pistons 37, 38 accommodated in the joint cylinder 21 (FIGS. 5 to 6). These pistons 37, 38 are axially active in opposite directions and press the brake 7, 8 from inwards against the associated friction rings 2, 3 during braking operation, i.e. pressurization of the second actuating device. In the illustrated variant, the primary piston 37 brings about the displacement of the floating caliper 1 and a compensation of brake pad wear, while the secondary piston 38 is used for the inevitable tolerance compensation. Therefore, the secondary piston 38 may have an axially shorter design.

To ventilate and bleed the hydraulic pressure chamber of the second actuating device, channels 27, 28, 29, 30 are provided, depending on the installation position, which are partly closed from the outside by means of balls 31, 40 in order to seal openings existing for reasons of manufacture.

Figure 7:
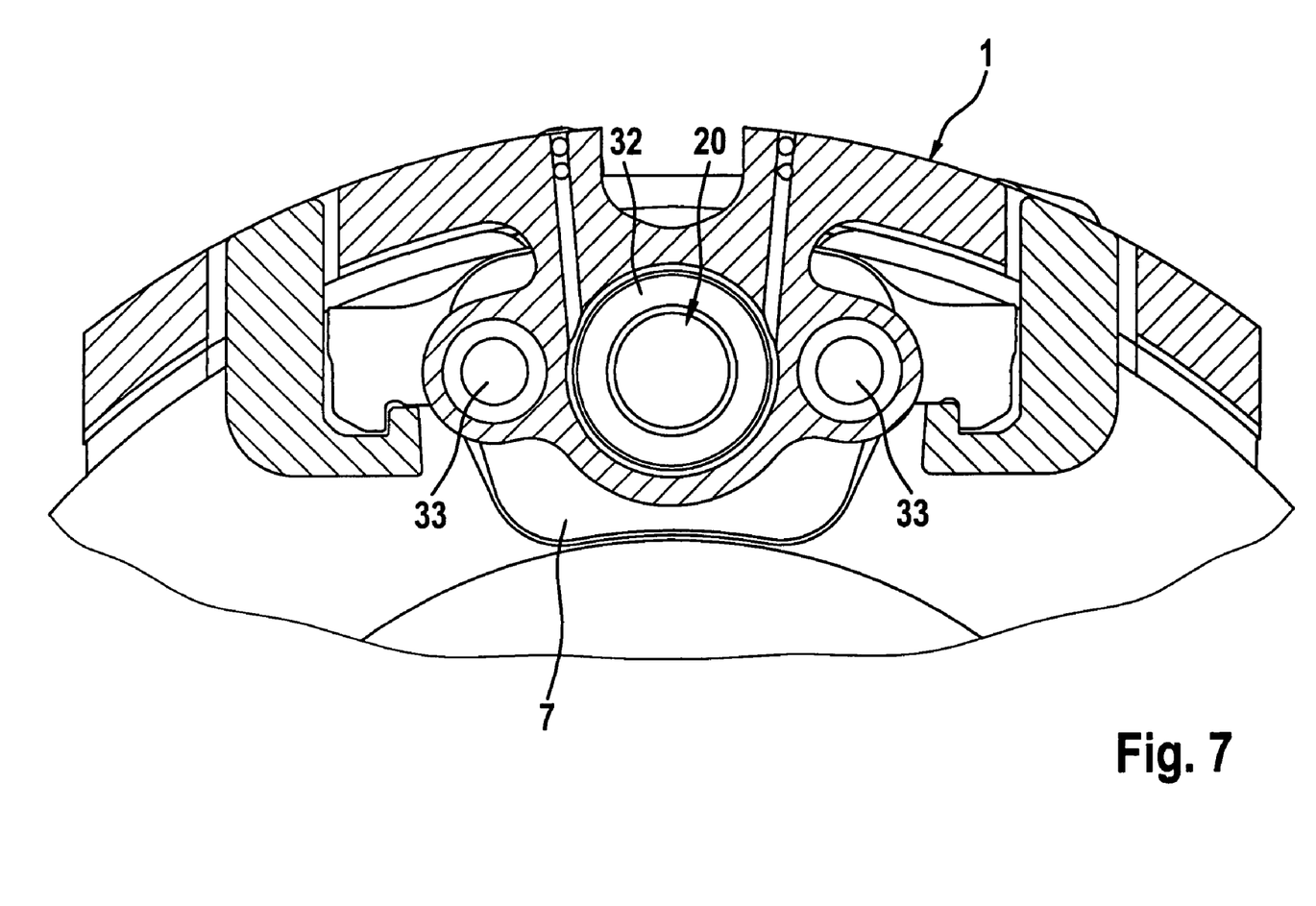
FIG. 7 shows a cross-sectional view of an alternative design of the second embodiment.
Figure 8:
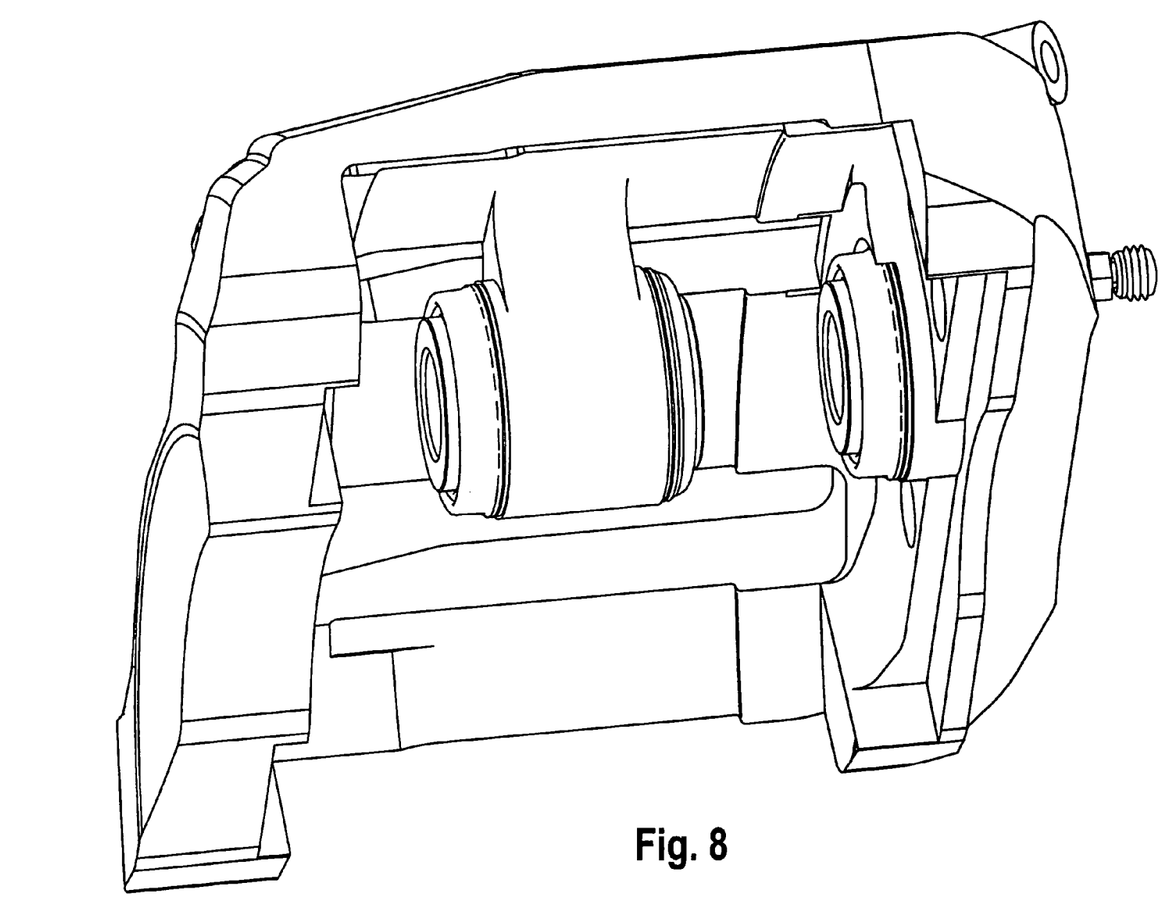
FIG. 8 shows a spatial view of the second embodiment.

Another embodiment of the disc brake 1 according to FIG. 7 shows a possibility of reducing the axial mounting space of the second actuating device 20. The hydraulically actuated second actuating device 20 comprises a first primary piston 32 that acts on the brake pad 8 in an axially outward direction and two secondary pistons 33 which oppositely act on the other brake pad 7 in an axially inward direction. In this arrangement, the primary piston 32 and the secondary pistons 33 are arranged in parallel inside the second actuating device. Preferably a design according to FIG. 7 is chosen, according to which two smaller secondary pistons 33 having an equal resulting piston surface like the primary piston 32 are used. Of course it is also possible to reverse such a dimensioning so that a large secondary piston 33 and two smaller primary pistons 32 can be employed in a similar fashion. The hydraulic pressure chambers of the second actuating device are ventilated and bled preferably similar to the embodiment according to FIGS. 5, 6, 8.

In the course of the simplification of manufacture, the floating caliper 1 is preferably configured in two parts, and the two parts are interconnected. The configuration of the disc brake in particular with the second actuating device between the friction rings 2, 3, as shown in the invention, is of course not limited to the embodiments shown in the Figures. The brake caliper of the disc brake into which also the second actuating device is integrated can alternatively be designed as a fixed caliper. The precondition for this is a second actuating device 20 acting axially on both sides. In addition, the configuration of a disc brake according to the invention is also applicable to arrangements having more than two friction rings, which are connected to a rotatable hub at a fixed axial distance.

The advantage of a disc brake of the invention having a brake caliper into which the second actuating device is integrated is the simple overall construction that permits low-cost manufacture. Besides, an axially very compact disc brake is achieved, favorably necessitating a small mounting space. In addition, the configuration of the brake caliper allows dividing the floating caliper, which is advantageous in terms of manufacturing engineering. The entire disc brake is basically insensitive to corrosion signs due to the axially stationary arrangement of the friction rings and the integration of the second actuating device into the brake caliper. As regards a comfortable brake pad guide or floating caliper guide (in a floating caliper design), reference can be made to solutions in the prior art that are functionally reliable to a sufficient degree.

The invention claimed is:

1. A disc brake comprising a pair of friction rings arranged on a rotatable hub and fixed at an axial distance from each other, a brake holder, and a plurality of brake pads, the brake pads being displaceably arranged on both sides of each friction ring, a brake caliper straddling the friction rings and brake pads, a first actuating device disposed in the brake caliper at one side of one of the friction rings, and a second actuating device that is arranged between the friction rings, the brake holder having at least one axially extending recess, the brake pads and the second actuating device each comprising a lateral guide extension received in the recess, the lateral guide extensions of the brake pads and second actuating device being radially supported in the recess and axially displaceable in the recess to permit axial movement of the brake pads and second actuating device with respect to brake holder.

2. The disc brake as claimed in claim 1 comprising two brake pads arranged between the friction rings, wherein the second actuating device acts on both brake pads in a substantially simultaneous manner.

3. The disc brake as claimed in claim 1, wherein the caliper is a floating-caliper.

4. The disc brake as claimed in claim 1, wherein the brake holder having at least one axially extending recess comprises a pair of opposing holder arms arranged on each side of the brake pads, each holder arm comprising a recess.

5. The disc brake as claimed in claim 4, wherein the brake pads and the second actuation device each comprise a pair of lateral guide extensions radially supported and axially displaceable in the recesses of the holder arms.

6. The disc brake as claimed in claim 1, wherein the brake is a floating-caliper brake and the second actuating device is displaceably arranged at the caliper.

7. The disc brake as claimed in claim 1, wherein the second actuating device is housed in a generally cylindrical carrier, and the lateral guide extension of the second actuating device is integrally formed with the carrier.

8. The disc brake as claimed in claim 1, wherein the second actuating device comprises a cylinder axially displaceable against a first friction ring in a first direction, and a piston axially aligned with the cylinder and axially displaceable against a second friction ring in a second direction opposite the first direction.

9. The disc brake as claimed in claim 1, wherein the second actuating device comprises a primary piston axially displaceable against a first friction ring in a first direction, and a pair of secondary pistons axially displaceable against a second friction ring in a second direction opposite the first direction, the primary and secondary pistons disposed in a parallel arrangement, with the primary piston disposed between the secondary pistons.

10. A disc brake comprising a pair of friction rings arranged on a rotatable hub and fixed at an axial distance from each other, a brake holder, and a plurality of brake pads, the brake pads being displaceably arranged on both sides of each friction ring, a brake caliper straddling the friction rings and brake pads, a first actuating device disposed in the brake caliper at one side of one of the friction rings, and a second actuating device that is arranged between the friction rings, the second actuating device being housed in a connection integrally formed with the caliper, the brake holder having at least one axially extending recess, the brake pads each comprising a lateral guide extension received in the recess, the lateral guide extensions of the brake pads being axially guided in the recess to permit axial movement of the brake pads with respect to the brake holder, the second actuating device comprising a first piston and a second piston, the first and second pistons axially aligned with one another and carried in a cylinder fixedly connected with the caliper, the first piston being axially displaceable against a first of said friction rings and the second piston being axially displaceable against a second of said friction rings, wherein the first piston has an axial length that exceeds an axial length of the second piston by an amount sufficient to compensate for axial displacement of the caliper due to wear of the brake pads.

11. The disc brake as claimed in claim 10, wherein the two pistons are connected to a hydraulic circuit feeding the first actuating device, the hydraulic circuit extending from the caliper into the cylinder.

12. The disc brake as claimed in claim 10 wherein the cylinder, connection and caliper are formed as a single integral cast piece.

13. A disc brake comprising a pair of friction rings arranged on a rotatable hub and fixed at an axial distance from each other, a brake holder, and a plurality of brake pads, the brake pads being displaceably arranged on both sides of each friction ring, a brake caliper straddling the friction rings and brake pads, a first actuating device disposed in the brake caliper at one side of one of the friction rings, and a second actuating device that is arranged between the friction rings, the brake holder having at least one axially extending recess, the brake pads each comprising a lateral guide extension received in the recess, the lateral guide extensions of the brake pads being axially displaceable in the recess to permit axial movement of the brake pads with respect to brake holder, the second actuating device being housed in a connection integrally formed with the caliper in an integral cast piece, wherein the integral connection contains a large diameter piston axially displaceable against a first friction ring in a first direction, and a pair of smaller diameter pistons axially displaceable against a second friction ring in a second direction opposite the first direction, the pistons disposed in a parallel arrangement.

14. The disc brake as claimed in claim 13 comprising two brake pads arranged between the friction rings, wherein the second actuating device acts on the two brake pads in a substantially simultaneous manner.

15. The disc brake as claimed in claim 13, wherein the brake holder having at least one axially extending recess comprises a pair of opposing holder arms arranged on each side of the brake pads, each holder arm comprising a recess.

16. The disc brake as claimed in claim 15, wherein the brake pads each comprise a pair of lateral guide extensions radially supported and axially displaceable in the recesses of the holder arms.

17. The disc brake as claimed in claim 13, wherein the large diameter piston is displaceable axially inwardly against the first friction ring, and the smaller diameter pistons are displaceable axially outwardly against the second friction ring.

* * * * *